United States Patent
Zhu

(10) Patent No.: US 11,909,678 B2
(45) Date of Patent: Feb. 20, 2024

(54) DETERMINATION METHOD AND DEVICE FOR SIZE OF DOWNLINK CONTROL INFORMATION FORMAT

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 19 days.

(21) Appl. No.: 16/980,624

(22) PCT Filed: Apr. 4, 2018

(86) PCT No.: PCT/CN2018/081948
§ 371 (c)(1),
(2) Date: Sep. 14, 2020

(87) PCT Pub. No.: WO2019/191948
PCT Pub. Date: Oct. 10, 2019

(65) Prior Publication Data
US 2021/0058205 A1 Feb. 25, 2021

(51) Int. Cl.
*H04L 5/00* (2006.01)
*H04L 1/00* (2006.01)
(Continued)

(52) U.S. Cl.
CPC .......... *H04L 5/0044* (2013.01); *H04L 1/0061* (2013.01); *H04W 72/0466* (2013.01); *H04W 72/23* (2023.01)

(58) Field of Classification Search
CPC ... H04L 5/0044; H04L 1/0061; H04L 1/0072; H04L 1/0075; H04L 5/0091;
(Continued)

(56) References Cited

U.S. PATENT DOCUMENTS

2010/0214938 A1 8/2010 Chen et al.
2012/0033627 A1* 2/2012 Li .............................. H04L 5/14
370/329
(Continued)

FOREIGN PATENT DOCUMENTS

CN 101605375 A 12/2009
CN 102158978 A 8/2011
(Continued)

OTHER PUBLICATIONS

International Search Report in the International Application No. PCT/CN2018/081948, dated Dec. 28, 2018.
(Continued)

*Primary Examiner* — Ajit Patel
*Assistant Examiner* — Wilfred Thomas
(74) *Attorney, Agent, or Firm* — Finnegan, Henderson, Farabow, Garrett & Dunner, L.L.P.

(57) ABSTRACT

The present invention relates to a determination method and device for the size of a downlink control information format. The method includes: determining, according to a length of information bits carried by a downlink control information (DCI) format, a size of the DCI format that needs to be detected by a terminal; and sending the size of the DCI format to the terminal. According to the technical solution, the size of the DCI format is determined by means of the length of the information bits actually to be carried by the DCI format, and the size of the DCI format is related to the length of the information bits actually to be carried by the DCI format, which can prevent the problem of resource waste caused by a DCI format with fixed length in the related art and increase resource utilization.

12 Claims, 6 Drawing Sheets

(51) Int. Cl.
*H04W 72/044* (2023.01)
*H04W 72/23* (2023.01)

(58) Field of Classification Search
CPC ..... H04L 1/0079; H04L 5/0053; H04L 1/004; H04W 72/042; H04W 72/0466
See application file for complete search history.

(56) References Cited

U.S. PATENT DOCUMENTS

| | | |
|---|---|---|
| 2012/0046027 A1 | 2/2012 | Baker et al. |
| 2012/0127938 A1* | 5/2012 | Lv ............... H04W 72/1205 370/329 |
| 2013/0121274 A1 | 5/2013 | Chen et al. |
| 2014/0105164 A1* | 4/2014 | Moulsley ......... H04W 72/1289 370/329 |
| 2015/0003384 A1* | 1/2015 | Kawasaki ............ H04L 1/1887 370/329 |
| 2015/0257086 A1* | 9/2015 | Jiang .................. H04W 48/08 370/329 |
| 2016/0345311 A1* | 11/2016 | Chen ................... H04L 5/0044 |
| 2016/0381666 A1 | 12/2016 | Kim et al. |
| 2017/0019227 A1* | 1/2017 | Han ..................... H04L 1/1812 |
| 2017/0238260 A1 | 8/2017 | Kim et al. |
| 2017/0265060 A1* | 9/2017 | Bin Sediq ............ H04L 27/186 |
| 2018/0077651 A1* | 3/2018 | Nory .................. H04W 52/281 |
| 2018/0077693 A1 | 3/2018 | Chen et al. |
| 2018/0123769 A1* | 5/2018 | Pelletier ............... H04L 5/0094 |
| 2018/0176892 A1 | 6/2018 | Kim et al. |
| 2019/0182855 A1* | 6/2019 | Babaei ............. H04W 72/1268 |
| 2020/0187170 A1* | 6/2020 | Shin ..................... H04W 72/042 |
| 2020/0322927 A1* | 10/2020 | Lin ....................... H04L 5/0048 |
| 2021/0100047 A1* | 4/2021 | Chiba ................... H04W 88/06 |
| 2021/0204282 A1* | 7/2021 | Lee ...................... H04L 5/0055 |
| 2021/0235479 A1* | 7/2021 | Tang ................. H04W 72/1289 |
| 2021/0289532 A1* | 9/2021 | Zhang ............... H04W 72/1289 |
| 2022/0256570 A1* | 8/2022 | Park ..................... H04W 48/12 |

FOREIGN PATENT DOCUMENTS

| | | |
|---|---|---|
| CN | 102415182 A | 4/2012 |
| CN | 103199974 A | 7/2013 |
| CN | 106063352 A | 10/2016 |
| CN | 106165510 A | 11/2016 |
| CN | 106455095 A | 2/2017 |
| CN | 106688295 A | 5/2017 |
| CN | 106797530 A | 5/2017 |
| EP | 3 179 811 A1 | 6/2017 |

OTHER PUBLICATIONS

First Office Action of the Chinese Application No. 201880000506.9, dated Jul. 1, 2020.

* cited by examiner

DETERMINATION METHOD AND DEVICE FOR SIZE OF DOWNLINK CONTROL INFORMATION FORMAT

CROSS REFERENCE TO RELATED APPLICATIONS

This application is a national phase application based on International Application No. PCT/CN2018/081948, filed Apr. 4, 2018, the content of which is incorporated herein by reference.

TECHNICAL FIELD

The present disclosure relates to the technical field of communication, and more particularly, to a method and device for determining a size of a downlink control information (DCI) format.

BACKGROUND

In a long term evolution (LTE) communication system, the transmission of uplink and downlink data of physical layers is scheduled by a base station via sending DCI. At the meantime, the DCI may further be configured for the base station to transmit some information for public control, for example, to send system information, paging information, power control information, and the like. In the LTE system, a variety of DCI formats are defined. Based upon different transmission modes of terminals, the terminals need to detect the different DCI formats to obtain scheduling information. Moreover, the terminals further need to detect DCI formats for the public control. In the LTE system, it is defined that DCI format 1A and 1C are configured to schedule the transmission of public information.

While a new generation of augmented reality (AR)/virtual reality (VR), vehicle-vehicle communication and other novel Internet applications emerge continuously, higher requirements are provided for wireless communication technologies, thereby driving continuous evolution of the wireless communication technologies to meet the requirements of the applications. At present, the cellular mobile communication technology is in an evolutional stage of the new generation of communication technologies. One important feature of the new generation of communication technologies is to support flexible configuration for multiple service types. Different service types have different requirements on the wireless communication technologies, for example, the service type of the enhanced mobile broad band (eMBB) mainly emphasizes on a broad band, a high rate and the like, the service type of the ultra reliable low latency communication (URLLC) mainly emphasizes on high reliability and low delay, and the service type of the massive machine type communication (mMTC) mainly emphasizes on the large connection number. Therefore, the new generation of wireless communication systems require the flexible and configurable designs to support the transmission for the multiple service types.

In the related art, the standard organizations also define several DCI formats presently for the new generation of wireless communication systems to schedule the transmission of the public information and schedule the uplink and downlink data.

SUMMARY

Embodiments of the present disclosure provide a method and device for determining a size of a DCI format. The technical solutions are as follows.

According to a first aspect of embodiments of the present disclosure, a method for determining a size of a DCI format is provided, which may be applied to a network device side, and may include: according to a length of information bits borne by a DCI format, a size of the DCI format that needs to be detected by a terminal is determined; and the size of the DCI format is sent to the terminal.

The technical solutions provided by the embodiment of the present disclosure may include the following beneficial effects: according to the technical solutions, the size of the DCI format is determined according to the length of the information bits to be actually borne by the DCI format, and the size of the DCI format is relevant to the length of the information bits to be actually borne by the DCI format, such that the problem of resource waste caused by the DCI format with the fixed length in the related art can be avoided, thereby improving the resource utilization rate.

In an embodiment, the operation that the size of the DCI format is sent to the terminal may include: a system message is sent to the terminal, and the system message includes information capable of determining the length of the information bits borne by the DCI format; or, first control signaling is sent to the terminal, and the first control signaling includes information capable of determining the length of the information bits borne by the DCI format.

In an embodiment, the operation that according to the length of the information bits borne by the DCI format, the size of the DCI format that needs to be detected by the terminal is determined may include: in response to the length of the information bits borne by the DCI format being less than a size of a predetermined DCI format, a preset sequence is filled after the information bits in the DCI format, and a size of the filled DCI format is identical with the size of the predetermined DCI format; and the size of the filled DCI format is determined as the size of the DCI format that needs to be detected by the terminal.

In an embodiment, the method may further include: second control signaling is sent to the terminal, and the second control signaling includes the size of the predetermined DCI format and a number of sizes of the predetermined DCI format.

In an embodiment, the method may further include: cyclical redundancy check (CRC) length information for the DCI format is sent to the terminal; or, a proportional relationship between a CRC length and the size of the DCI format is sent to the terminal.

According to a second aspect of embodiments of the present disclosure, a method for determining a size of a DCI format is provided, which may be applied to a terminal side, and may include: a size of a DCI format sent by a network device is received, and the size of the DCI format is the size of the DCI format that is determined by the network device according to a length of information bits borne by the DCI format and that needs to be detected by a terminal; and in response to detecting DCI matching the size of the DCI format, information bits borne by the DCI format are acquired.

In an embodiment, the operation that the size of the DCI format sent by the network device is received may include: a system message sent by the network device is received, and the system message includes information capable of determining the length of the information bits borne by the DCI format; or, first control signaling sent by the network device is received, and the first control signaling includes information capable of determining the length of the information bits borne by the DCI format.

In an embodiment, the method may further include: second control signaling sent by the network device is received, and the second control signaling includes a size of a predetermined DCI format and a number of sizes of the predetermined DCI format; and a number of blind detection times of the terminal is determined according to the size of the predetermined DCI format and the number of sizes of the predetermined DCI format.

In an embodiment, the method may further include: a proportional relationship between a CRC length and the size of the DCI format that is sent by the network device is received; and a CRC length for the DCI format is determined according to the size of the DCI format and the proportional relationship between the CRC length and the size of the DCI format; or, CRC length information for the DCI format sent by the network device is received.

According to a third aspect of embodiments of the present disclosure, a device for determining a size of a DCI format is provided, which may include: a first determination module, configured to determine, according to a length of information bits borne by a DCI format, a size of the DCI format that needs to be detected by a terminal; and a first sending module, configured to send the size of the DCI format to the terminal.

In an embodiment, the first sending module may be configured to send a system message to the terminal, and the system message may include information capable of determining the length of the information bits borne by the DCI format. Or, the first sending module may be configured to send first control signaling to the terminal, and the first control signaling may include information capable of determining the length of the information bits borne by the DCI format.

In an embodiment, the first determination module may include: a filling submodule, configured to fill, in response to the length of the information bits borne by the DCI format being less than a size of a predetermined DCI format, a preset sequence after the information bits in the DCI format, a size of the filled DCI format being identical with the size of the predetermined DCI format; and a determination submodule, configured to determine the size of the filled DCI format as the size of the DCI format that needs to be detected by the terminal.

In an embodiment, the device may further include: a second sending module, configured to send second control signaling to the terminal, and the second control signaling may include a size of a predetermined DCI format and a number of sizes of the predetermined DCI format.

In an embodiment, the device may further include: a third sending module, configured to send CRC length information for the DCI format to the terminal; or, send a proportional relationship between a CRC length and the size of the DCI format to the terminal.

According to a fourth aspect of embodiments of the present disclosure, a device for determining a size of a DCI format is provided, which may include: a first receiving module, configured to receive a size of a DCI format sent by a network device, the size of the DCI format being the size of the DCI format that is determined by the network device according to a length of information bits borne by the DCI format and that needs to be detected by a terminal; and a first acquisition module, configured to acquire, in response to detecting DCI matching the size of the DCI format, information bits borne by the DCI format.

In an embodiment, the first receiving module is configured to receive a system message sent by the network device, the system message including information capable of determining the length of the information bits borne by the DCI format; or, the first receiving module is configured to receive first control signaling sent by the network device, the first control signaling including information capable of determining the length of the information bits borne by the DCI format.

In an embodiment, the device may further include: a second receiving module, configured to receive second control signaling sent by the network device, the second control signaling including a size of a predetermined DCI format and a number of sizes of the predetermined DCI format; and a second determination module, configured to determine a number of blind detection times of the terminal according to the size of the predetermined DCI format and the number of sizes of the predetermined DCI format.

In an embodiment, the device may further include: a third receiving module, configured to receive a proportional relationship between a CRC length and the size of the DCI format that is sent by the network device; and a third determination module, configured to determine a CRC length for the DCI format according to the size of the DCI format and the proportional relationship between the CRC length and the size of the DCI format.

In an embodiment, the device may further include: a fourth receiving module, configured to receive CRC length information for the DCI format sent by the network device.

According to a fifth aspect of embodiments of the present disclosure, a device for determining a size of a DCI format is provided, which may include: a processor; and a memory configured to store instructions executable by the processor. The processor is configured to: determine, according to a length of information bits borne by a DCI format, a size of the DCI format that needs to be detected by a terminal; and send the size of the DCI format to the terminal.

According to a sixth aspect of embodiments of the present disclosure, a device for determining a size of a DCI format is provided, which may include: a processor; and a memory configured to store instructions executable by the processor. The processor is configured to: receive a size of a DCI format sent by a network device, the size of the DCI format being the size of the DCI format that is determined by the network device according to a length of information bits borne by the DCI format and that needs to be detected by a terminal; and acquire, in response to detecting DCI matching the size of the DCI format, information bits borne by the DCI format.

According to a seventh aspect of embodiments of the present disclosure, a computer-readable storage medium is provided, on which computer instructions are stored. The instructions are executed by a processor to implement the steps of the method in the first aspect.

According to an eighth aspect of embodiments of the present disclosure, a computer-readable storage medium is provided, on which computer instructions are stored. The instructions are executed by a processor to implement the steps of the method in the second aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

In the related art, the standard organizations also define several DCI formats presently for the new generation of wireless communication systems to schedule the transmission of the public information and schedule the uplink and downlink data. However, the DCI format defined in the related art has a large payload, and some information is unnecessarily indicated by such a large load in transmission, such that the waste resource is caused.

In order to solve the above problems, the embodiments of the present disclosure provide a method for determining a size of a DCI format. The method may include: according to a length of information bits borne by a DCI format, a size of the DCI format that needs to be detected by a terminal is determined; and the size of the DCI format is sent to the terminal. In the method for determining the size of the DCI format provided by the embodiments of the present disclosure, the size of the DCI format is relevant to the length of the information bits to be actually borne by the DCI format, and the size of the DCI format is determined according to the length of the information bits to be actually borne by the DCI format, such that the problem of resource waste caused by the DCI format with the fixed length in the related art can be avoided, thereby improving the resource utilization rate.

In view of the above analysis, specific embodiments are provided as follows.

Figure 1:
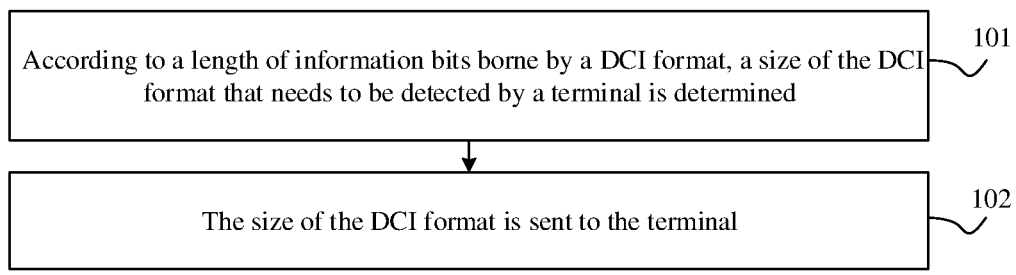
FIG. 1 is a flow chart of a method for determining a size of a DCI format according to an exemplary embodiment.

FIG. 1 is a flow chart of a method for determining a size of a DCI format according to an exemplary embodiment. The execution main body of the method may be a network device, such as a base station. As illustrated in FIG. 1, the method may include the following steps 101 to 102.

In step 101, according to a length of information bits borne by a DCI format, a size of the DCI format that needs to be detected by a terminal is determined.

Exemplarily, the terminal may be, for example, a mobile phone, a tablet computer, a wearable device (such as a bracelet) or the like. In the related art, the size of the DCI format has a fixed bit length. When the bandwidth is unchanged, the bit length of the DCI format is consistent. Unlike the relevant art, the size of the DCI format in the present disclosure may be configurable, and the size of the DCI format is not necessarily in an association relationship with the bandwidth. In the present disclosure, according to the information bits actually borne by the DCI format, the number of unused information domains in the DCI format in the related art is reduced, and the number of unused bits in the information domains of the DCI format in the related art is reduced, the size of the DCI format in the present disclosure is determined. In case of a small length of the information bits to be actually borne by the DCI format, the size of the DCI format is also small, thereby avoiding the resource waste.

In step 102, the size of the DCI format is sent to the terminal.

Exemplarily, after the network device determines the size of the DCI format that needs to be detected by the terminal according to the length of the information bits borne by the DCI format, the network device sends the terminal a system message including the size of the DCI format that needs to be detected by the terminal or information capable of determining the size of the DCI format. Or, the network device sends the terminal first control signaling including the size of the DCI format that needs to be detected by the terminal or information capable of determining the size of the DCI format. For example, the first control signaling is high layer signaling, media access control (MAC) control element (CE) signaling, physical layer signaling or the like. The information capable of determining the size of the DCI format is, for example, information capable of determining the length of the information bits borne by the DCI format. The terminal determines the size of the DCI format according to the information capable of determining the size of the DCI format.

For example, the size of the DCI format is notified by the network device to the terminal through system information. During an initial access process of the terminal, the system message sent by the network device to the terminal includes the size of the DCI format or the information capable of determining the length of the information bits borne by the DCI format, and the terminal receives and analyzes corresponding parameters in the system message to obtain the size of the DCI format or the information capable of determining the length of the information bits borne by the DCI format. The terminal determines the length of the information bits borne by the DCI format according to the information capable of determining the length of the information bits borne by the DCI format, thereby determining the size of the DCI format.

For example, the size of the DCI format is notified by the network device to the terminal through the high layer signaling, the MAC CE signaling or the physical layer signaling. Upon the completion of the initial access process of the terminal, the high layer signaling, the MAC CE signaling or the physical layer signaling sent by the network device to the terminal includes the size of the DCI format or the information capable of determining the length of the information bits borne by the DCI format. The terminal receives and analyzes the high layer signaling, the MAC CE signaling or the physical layer signaling to obtain the size of the DCI format or the information capable of determining the length of the information bits borne by the DCI format. The terminal determines the length of the information bits borne by the DCI format according to the information capable of determining the length of the information bits borne by the DCI format, thereby determining the size of the DCI format.

By using the technical solutions provided by the embodiments of the present disclosure, the size of the DCI format is determined according to the length of the information bits to be actually borne by the DCI format, and the size of the DCI format is relevant to the length of the information bits to be actually borne by the DCI format, such that the problem of resource waste caused by the DCI format with the fixed length in the related art can be avoided, thereby improving the resource utilization rate.

Figure 2A:
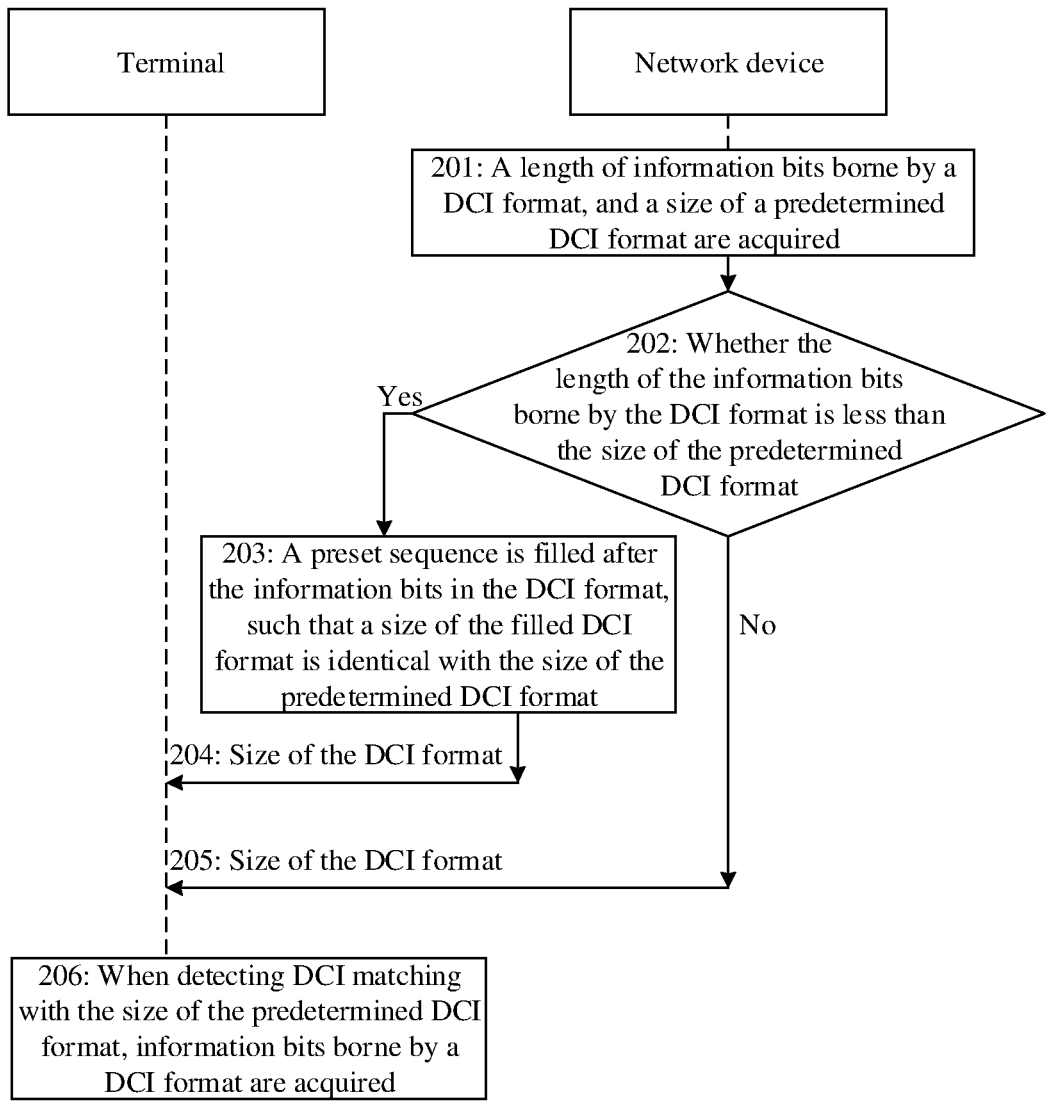
FIG. 2a is a flow chart of a method for determining a size of a DCI format according to an exemplary embodiment.

FIG. 2a is a flow chart of a method for determining a size of a DCI format according to an exemplary embodiment. As illustrated in FIG. 2a, the method is implemented by the network device and the terminal cooperatively. On the basis of the embodiments illustrated in FIG. 1, the method for determining the size of the DCI format in the present disclosure may include the following steps 201 to 206.

In step 201, a network device acquires a length of information bits borne by a DCI format, and a size of a predetermined DCI format.

Exemplarily, the size of the predetermined DCI format may be a size of a DCI format that needs to be detected by a terminal, for example, a size of an existing DCI format. The terminal at least supports one DCI format. The network device acquires capability information of the terminal, and determines the size of the DCI format that needs to be detected by the terminal and the number of sizes of DCI format that needs to be detected according to the capability information of the terminal. With reference to Table 1, corresponding to the terminal capability 1, the size of the DCI format that needs to be detected is 60 bits, and the number of sizes of DCI format that needs to be detected is one; and corresponding to the terminal capability 2, the sizes of the DCI format that needs to be detected are 40 bits and 60 bits, and the number of sizes of DCI format that needs to be detected is two.

TABLE 1

| Terminal capability | The number of sizes of DCI format that needs to be detected | Size of DCI format that needs to be detected |
| --- | --- | --- |
| Terminal capability 1 | 1 | 60 bits |
| Terminal capability 2 | 2 | 40 bits, 60 bits. |
| . . . | . . . | . . . |

TABLE 1-continued

| Terminal capability | The number of sizes of DCI format that needs to be detected | Size of DCI format that needs to be detected |
| --- | --- | --- |
| Terminal capability N | M | . . . |

Exemplarily, the network device sends second control signaling to the terminal, and the second control signaling includes the size of the predetermined DCI format and the number of sizes of the predetermined DCI format. For example, the network device may send the size of the predetermined DCI format and the number of sizes of the predetermined DCI format to the terminal through radio resource control (RRC) signaling, MAC CE signaling or physical layer signaling. Or, according to a protocol, the terminal prestores the size of the predetermined DCI format and the number of sizes of the predetermined DCI format and other information.

In step 202, the network device determines whether the length of the information bits borne by the DCI format is less than the size of the predetermined DCI format; when the length of the information bits borne by the DCI format is less than the size of the predetermined DCI format, step 203 is executed; when the length of the information bits borne by the DCI format is equal to the size of the predetermined DCI format, step 205 is executed.

In step 203, the network device fills a preset sequence after the information bits in the DCI format, such that a size of the filled DCI format is identical with the size of the predetermined DCI format.

Figure 2B:
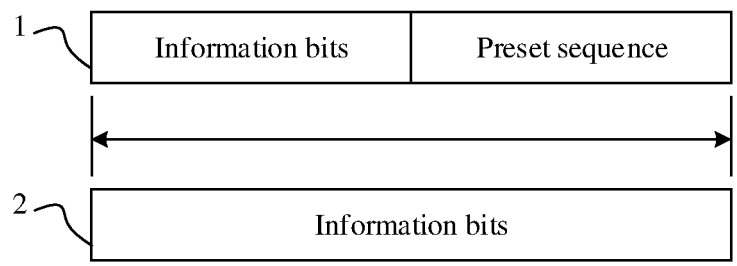
FIG. 2b is a schematic diagram for filling a preset sequence in a DCI format according to an exemplary embodiment.

Exemplarily, referring to FIG. 2b, the preset sequence is filled after the information bits in the DCI format 1, such that the size of the filled DCI format 1 (i.e., the bit length) is identical with the size of the predetermined DCI format 2 (i.e., the bit length).

In step 204, the network device determines the size of the filled DCI format as the size of the DCI format, sends the size of the DCI format to the terminal, step 206 is executed.

In step 205, the network device determines the length of the information bits borne by the DCI format as the size of the DCI format, and sends the size of the DCI format to the terminal.

Exemplarily, the network device may send the size of the DCI format to the terminal. Or, the network device sends the length of the information bits borne by the DCI format, and the size of the predetermined DCI format to the terminal. According to the length of the information bits borne by the DCI format and the size of the predetermined DCI format, the terminal determines the size of the DCI format that needs to be detected by the terminal.

Or, the terminal prestores the size of the predetermined DCI format and other information. The network device only needs to send the length of the information bits borne by the DCI format to the terminal. According to the length of the information bits borne by the DCI format and the size of the predetermined DCI format, the terminal determines the size of the DCI format that needs to be detected by the terminal.

Or, the terminal prestores the length of the information bits borne by the DCI format and other information. The network device only needs to send the size of the predetermined DCI format to the terminal. According to the length of the information bits borne by the DCI format and the size of the predetermined DCI format, the terminal determines the size of the DCI format that needs to be detected by the terminal.

For example, the system message sent by the network device to the terminal includes the length of the information bits borne by the DCI format and the size of the predetermined DCI format. During the initial access process of the terminal, the system message sent by the network device to the terminal includes the length of the information bits borne by the DCI format and the size of the predetermined DCI format. The terminal receives and analyzes corresponding parameters in the system message to obtain the length of the information bits borne by the DCI format and the size of the predetermined DCI format. According to the length of the information bits borne by the DCI format and the size of the predetermined DCI format, the terminal determines the size of the DCI format that needs to be detected by the terminal. Or, the control signaling sent by the network device to the terminal includes the length of the information bits borne by the DCI format and the size of the predetermined DCI format. Upon the completion of the initial access process of the terminal, the high layer signaling, the MAC CE signaling or the physical layer signaling sent by the network device to the terminal includes the length of the information bits borne by the DCI format and the size of the predetermined DCI format. The terminal receives and analyzes the high layer signaling, the MAC CE signaling or the physical layer signaling to obtain the length of the information bits borne by the DCI format and the size of the predetermined DCI format.

Exemplarily, in order to distinguish the DCI formats with the same DCI length, in an implementation method, indication information is included in an information domain of DCI by the network device. The length of the information domain is determined based on the number of DCI formats that need to be filled. For example, four DCI formats need to be filled into the DCI formats of the same size, the information domain may be a 2-bit information domain; the information domain may be at a fixed position of the DCI format; and the length of the information domain may be configurable, or fixed. In another implementation method, the network device may distinguish different DCI formats by using different radio network temporary identities (RNTIs) or scrambling sequences.

In step 206, when detecting DCI matching the size of the predetermined DCI format, the terminal acquires information bits borne by a DCI format.

Exemplarily, the size of the DCI format that needs to be detected by the terminal is obtained according to the size of the predetermined DCI format. After the terminal acquires the number of sizes of the DCI format that needs to be detected, the number of blind detection times of the terminal is determined according to the number of sizes of the DCI format that needs to be detected.

By using the technical solutions provided by the embodiments of the present disclosure, the preset sequence is filled after the information bits in the DCI format, such that the size of the filled DCI format is identical with the size of the predetermined DCI format, and thus the lengths of multiple different DCI formats are adjusted to be consistent. During blind detection, the terminal determines the number of blind detection times according to the number of sizes of the DCI format that needs to be detected, such that the number of blind detection times of the terminal may be reduced.

Figure 3:
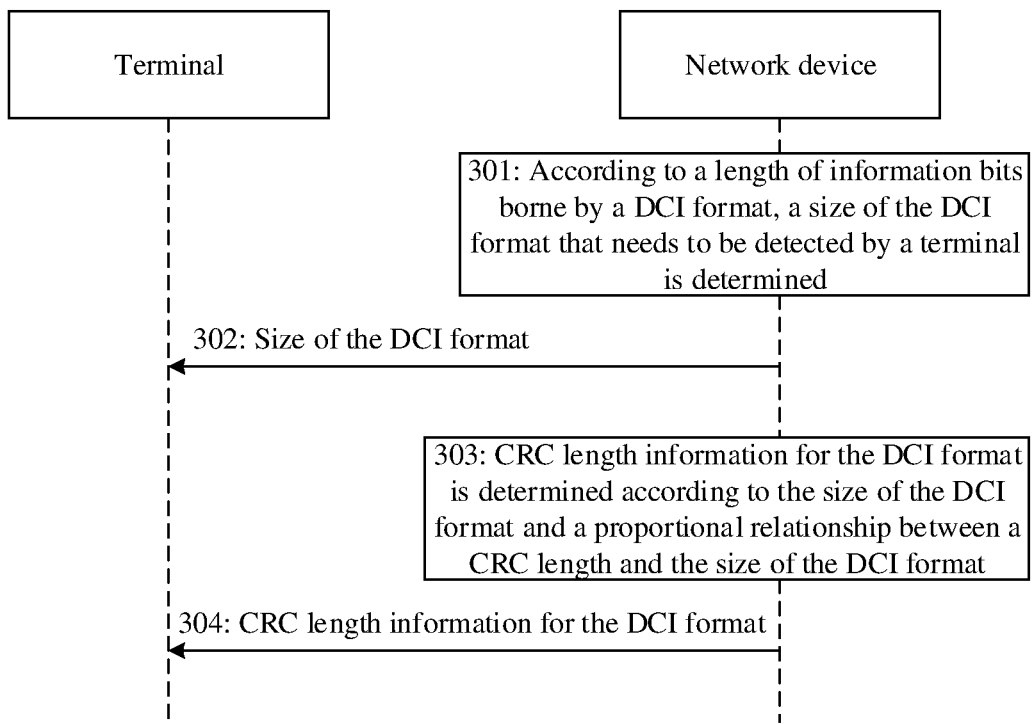
FIG. 3 is a flow chart of a method for determining a size of a DCI format according to an exemplary embodiment.

In the related art, the CRC length corresponding to the DCI format is specified by the protocol and is a fixed value, and the CRC length corresponding to the DCI format is not related with the size of the DCI format, the resources are wasted to some extent. In view of this, solutions for solving the problem are proposed. FIG. 3 is a flow chart of a method for determining a size of a DCI format according to an exemplary embodiment. As illustrated in FIG. 3, the method is implemented by the network device and the terminal cooperatively. On the basis of the embodiment illustrated in FIG. 1, the method for determining the size of the DCI format in the present disclosure may include the following steps 301 to 304.

In step 301, according to a length of information bits borne by a DCI format, a network device determines a size of the DCI format that needs to be detected by a terminal.

In step 302, the network device sends the size of the DCI format to the terminal, and the terminal receives the size of the DCI format sent by the network device.

Exemplarily, a system message sent by the network device to the terminal includes the size of the DCI format or information capable of determining the size of the DCI format, or, first control signaling sent by the network device to the terminal includes the size of the DCI format or information about the size of the DCI format. For example, the first control signaling is high layer signaling, MAC CE signaling or physical layer signaling, or the like. The terminal determines the length of the information bits borne by the DCI format according to the information capable of determining the size of the DCI format, thereby determining the size of the DCI format.

In step 303, the network device determines CRC length information for the DCI format according to the size of the DCI format and a proportional relationship between a CRC length and the size of the DCI format.

In step 304, the network device sends the CRC length information for the DCI format to the terminal, and the terminal receives the CRC length information for the DCI format sent by the network device.

Exemplarily, the network device sends the CRC length information for the DCI format to the terminal through RRC signaling, MAC CE signaling or physical layer signaling. Or, the network device sends the proportional relationship between the CRC length and the size of the DCI format to the terminal through the RRC signaling, the MAC CE signaling or the physical layer signaling; and the terminal determines the CRC length for the DCI format according to the size of the DCI format and the proportional relationship between the CRC length and the size of the DCI format.

By using the technical solutions provided by the embodiments of the present disclosure, the CRC length corresponding to the DCI format is determined based on the size of the DCI format. When the size of the DCI format is reduced, the CRC length corresponding to the DCI format is also reduced, thereby saving the resources.

The device embodiments of the present disclosure are set forth hereinafter, and may be configured to execute the method embodiments of the present disclosure.

Figure 4:
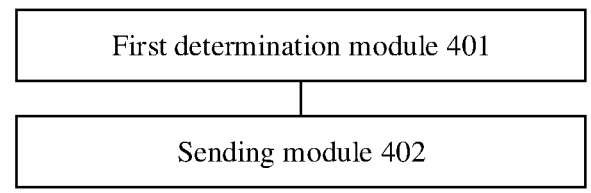
FIG. 4 is a block diagram of a device for determining a size of a DCI format according to an exemplary embodiment.

FIG. 4 is a block diagram of a device for determining a size of a DCI format according to an exemplary embodiment. The device may implement a part or all of the network device through software, hardware or a combination of the software and the hardware. Referring to FIG. 4, the device for determining the size of the DCI format may include: a first determination module 401 and a first sending module 402.

The first determination module 401 is configured to determine, according to a length of information bits borne by a DCI format, a size of the DCI format that needs to be detected by a terminal.

The first sending module 402 is configured to send the size of the DCI format to the terminal.

By using the device provided by the embodiment of the present disclosure, the size of the DCI format can be determined according to the length of the information bits to be actually borne by the DCI format, and the size of the DCI format is relevant to the length of the information bits to be actually borne by the DCI format, such that the problem of resource waste caused by the DCI format with the fixed length in the related art can be avoided, thereby improving the resource utilization rate.

In an embodiment, the first sending module 402 sends a system message to the terminal, and the system message includes information capable of determining the length of the information bits borne by the DCI format. Or, the first sending module 402 sends control signaling to the terminal, and the control signaling includes information capable of determining the length of the information bits borne by the DCI format.

Figure 5:
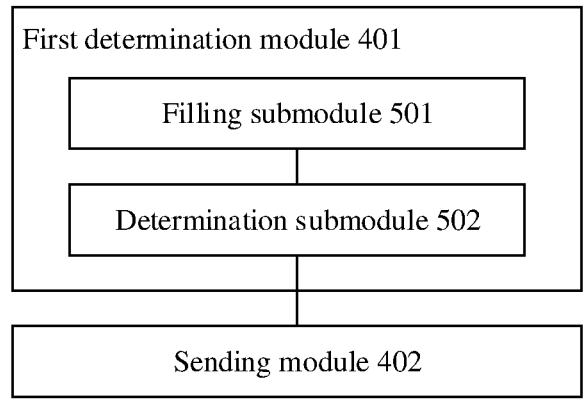
FIG. 5 is a block diagram of a device for determining a size of a DCI format according to an exemplary embodiment.

In an embodiment, as illustrated in FIG. 5, the device for determining the size of the DCI format in FIG. 4 may further be configured to cause the first determination module 401 to include: a filling submodule 501 and a determination submodule 502.

The filling submodule 501 is configured to fill, when the length of the information bits borne by the DCI format is less than a size of a predetermined DCI format, a preset sequence after the information bits in the DCI format, and a size of the filled DCI format is identical with the size of the predetermined DCI format.

The determination submodule 502 is configured to determine the size of the filled DCI format as the size of the DCI format that needs to be detected by the terminal.

Figure 6:
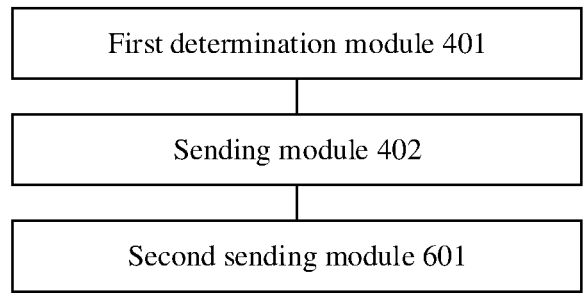
FIG. 6 is a block diagram of a device for determining a size of a DCI format according to an exemplary embodiment.

In an embodiment, as illustrated in FIG. 6, the device for determining the size of the DCI format in FIG. 4 may further include: a second sending module 601, configured to send second control signaling to the terminal, and the second control signaling includes the size of the predetermined DCI format and the number of sizes of the predetermined DCI format.

Figure 7:
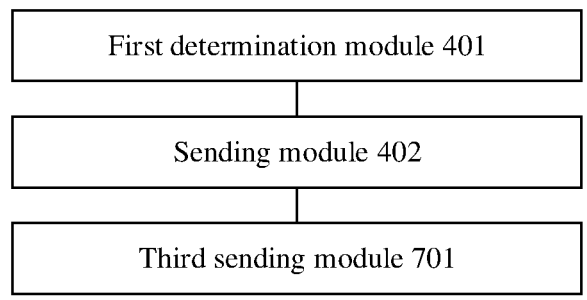
FIG. 7 is a block diagram of a device for determining a size of a DCI format according to an exemplary embodiment.

In an embodiment, as illustrated in FIG. 7, the device for determining the size of the DCI format in FIG. 4 may further include: a third sending module 701, configured to send CRC length information for the DCI format to the terminal, or send a proportional relationship between a CRC length and the size of the DCI format to the terminal.

Figure 8:
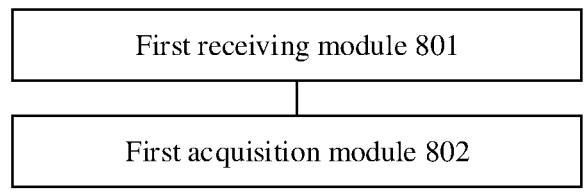
FIG. 8 is a block diagram of a device for determining a size of a DCI format according to an exemplary embodiment.

FIG. 8 is a block diagram of a device for determining a size of a DCI format according to an exemplary embodiment. The device may implement a part or all of the terminal through software, hardware or a combination of the software and the hardware. Referring to FIG. 8, the device for determining the size of the DCI format may include: a first receiving module 801 and a first acquisition module 802.

The first receiving module 801 is configured to receive a size of a DCI format sent by a network device, and the size of the DCI format is the size of the DCI format that is determined by the network device according to a length of information bits borne by the DCI format and that needs to be detected by a terminal.

The first acquisition module 802 is configured to acquire, when detecting DCI matching the size of the DCI format, information bits borne by the DCI format.

In an embodiment, the first receiving module 801 receives a system message sent by the network device, and the system message includes information capable of determining the length of the information bits borne by the DCI format. Or, the first receiving module 801 receives control signaling sent by the network device, and the control signaling includes information capable of determining the length of the information bits borne by the DCI format.

Figure 9:
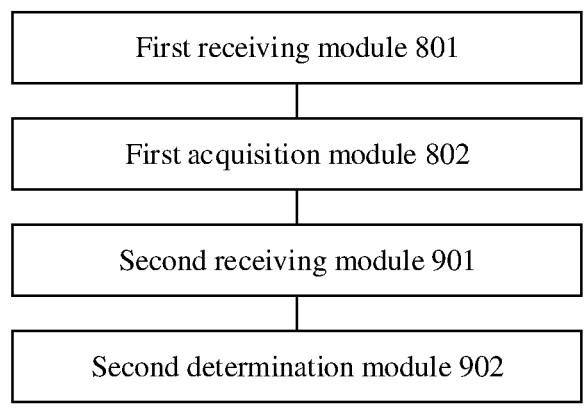
FIG. 9 is a block diagram of a device for determining a size of a DCI format according to an exemplary embodiment.

In an embodiment, as illustrated in FIG. 9, the device for determining the size of the DCI format in FIG. 8 may further include: a second receiving module 901 and a second determination module 902.

The second receiving module 901 is configured to receive second control signaling sent by the network device, and the second control signaling includes a size of a predetermined DCI format and the number of sizes of the predetermined DCI format.

The second determination module 902 is configured to determine the number of blind detection times of the terminal according to the size of the predetermined DCI format, and the number of sizes of the predetermined DCI format.

Figure 10:
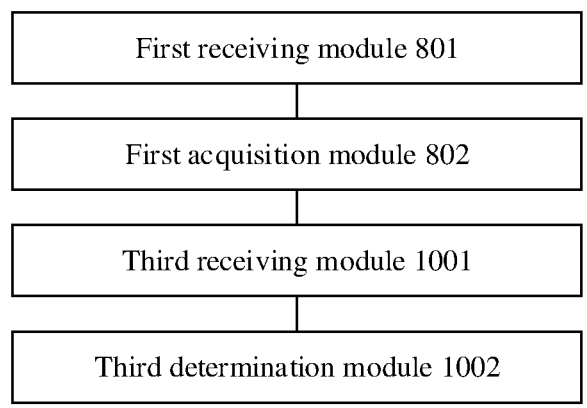
FIG. 10 is a block diagram of a device for determining a size of a DCI format according to an exemplary embodiment.

In an embodiment, as illustrated in FIG. 10, the device for determining the size of the DCI format in FIG. 8 may further include: a third receiving module 1001 and a third determination module 1002.

The third receiving module 1001 is configured to receive a proportional relationship between a CRC length and the size of the DCI format that is sent by the network device.

The third determination module 1002 is configured to determine a CRC length for the DCI format according to the size of the DCI format and the proportional relationship between the CRC length and the size of the DCI format.

Figure 11:
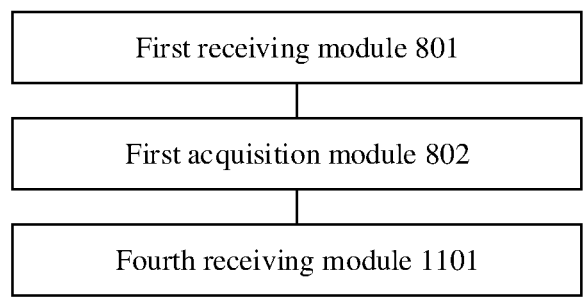
FIG. 11 is a block diagram of a device for determining a size of a DCI format according to an exemplary embodiment.

In an embodiment, as illustrated in FIG. 11, the device for determining the size of the DCI format in FIG. 8 may further include: a fourth receiving module 1101, configured to receive CRC length information for the DCI format that is sent by the network device.

In an exemplary embodiment, a device for determining a size of a DCI format is provided, which may include: a processor; and a memory configured to store instructions executable by the processor. The processor is configured to: determine, according to a length of information bits borne by a DCI format, a size of the DCI format that needs to be detected by a terminal; and send the size of the DCI format to the terminal.

The processor may further be configured to: send a system message to the terminal, the system message including the length of the information bits borne by the DCI format; or, send first control signaling to the terminal, the first control signaling including the length of the information bits borne by the DCI format.

The processor may further be configured to: fill, when the length of the information bits borne by the DCI format is less than a size of a predetermined DCI format, a preset sequence after the information bits in the DCI format, a size of the filled DCI format being identical with the size of the predetermined DCI format; and determine the size of the filled DCI format as the size of the DCI format that needs to be detected by the terminal.

The processor may further be configured to send second control signaling to the terminal, and the second control signaling includes the size of the predetermined DCI format.

The processor may further be configured to: send CRC length information for the DCI format to the terminal; or, send a proportional relationship between a CRC length and the size of the DCI format to the terminal.

In an exemplary embodiment, a device for determining a size of a DCI format is provided, which may include: a processor; and a memory configured to store instructions executable by the processor. The processor is configured to: receive a size of a DCI format sent by a network device, the size of the DCI format being the size of the DCI format that is determined by the network device according to a length of information bits borne by the DCI format and needs to be detected by a terminal; and acquire, when detecting DCI matching the size of the DCI format, information bits borne by the DCI format.

The processor may further be configured to: receive a system message sent by the network device, the system message including the length of the information bits borne by the DCI format; or, receive first control signaling sent by the network device, the first control signaling including the length of the information bits borne by the DCI format.

The processor may further be configured to: receive second control signaling sent by the network device, the second control signaling including the size of the predetermined DCI format; and determine the number of blind detection times of the terminal according to the size of the predetermined DCI format and the number of sizes of the predetermined DCI format.

The processor may further be configured to: receive a proportional relationship between a CRC length and the size of the DCI format that is sent by the network device; and determine a CRC length for the DCI format according to the size of the DCI format and the proportional relationship between the CRC length and the size of the DCI format.

For the device in the above embodiments, the specific manner for the operation executed by each module has been described in detail in the embodiments related to the method, which will not be repeated herein.

Figure 12:
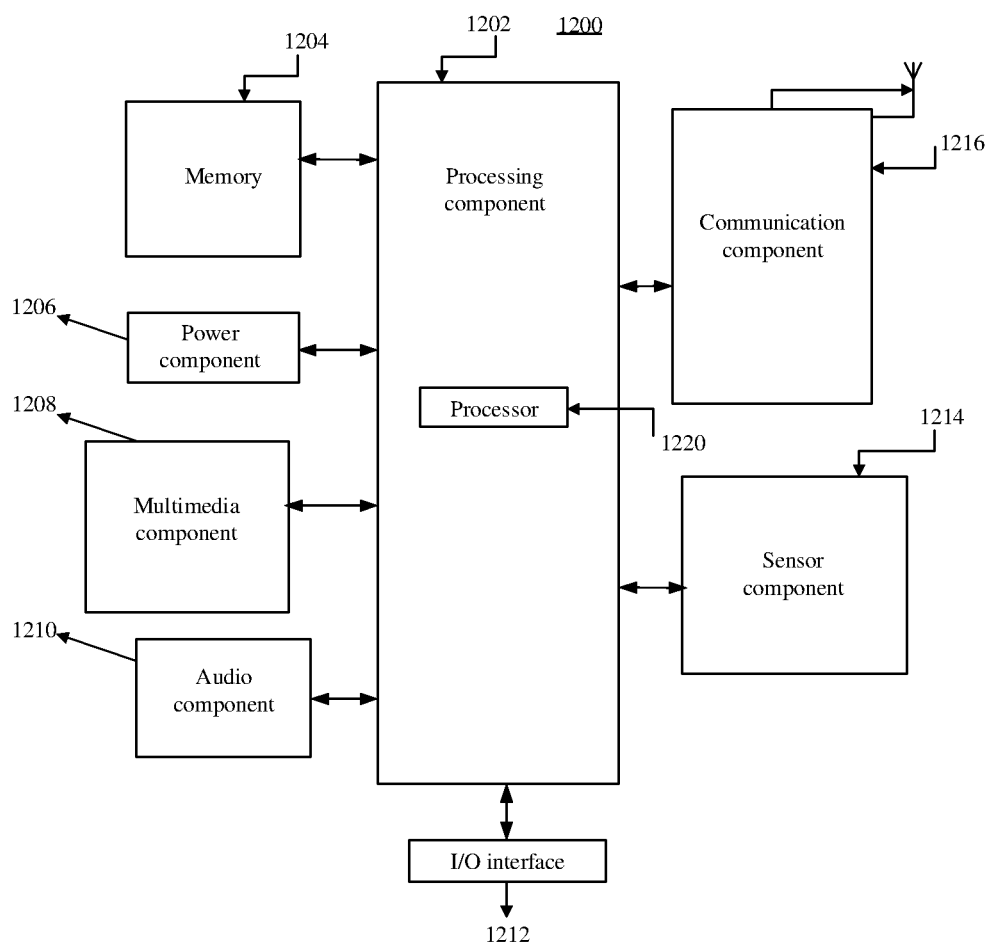
FIG. 12 is a block diagram of a device for determining a size of a DCI format according to an exemplary embodiment.

FIG. 12 is a block diagram of a device for determining a size of a DCI format according to an exemplary embodiment. The device 1200 for determining the size of the DCI format is applied to a terminal. The device 1200 for determining the size of the DCI format may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200 for determining the size of the DCI format, such as the operations associated with display, telephone calls, data communications, camera operations and recording operations. The processing component 1202 may include one or more processors 1220 to execute instructions to perform all or part of the steps in the above abovementioned methods. Moreover, the processing component 1202 may include one or more modules which facilitate interaction between the processing component 1202 and other components. For instance, the processing component 1202 may include a multimedia module to facilitate interaction between the multimedia component 1208 and the processing component 1202.

The memory 1204 is configured to store various types of data to support the operation of the device 1200 for determining the size of the DCI format. Examples of such data include instructions for any applications or methods operated on the device 1200 for determining the size of the DCI format, contact data, phonebook data, messages, pictures, video, etc. The memory 1204 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1206 provides power for various components of the device 1200 for determining the size of the DCI format. The power component 1206 may include a power management system, one or more power supplies, and other components associated with generation, management and distribution of power for the device 1200 for determining the size of the DCI format.

The multimedia component 1208 includes a screen providing an output interface between the device 1200 for determining the size of the DCI format and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1208 includes a front camera and/or a rear camera. The front camera and/or the rear camera may receive external multimedia data when the device 1200 for determining the size of the DCI format is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a microphone (MIC), and the MIC is configured to receive an external audio signal when the device 1200 for determining the size of the DCI format is in an operation mode, such as a call mode, a recording mode and a voice recognition mode. The received audio signal may further be stored in the memory 1204 or sent via the communication component 1216. In some embodiments, the audio component 1210 further includes a speaker configured to output the audio signal.

The I/O interface 1212 provides an interface between the processing component 1202 and peripheral interface modules, such as a keyboard, a click wheel, buttons and the like. The buttons may include, but are not limited to: a home button, a volume button, a starting button and a locking button.

The sensor component 1214 includes one or more sensors configured to provide status assessments in various aspects for the device 1200 for determining the size of the DCI format. For instance, the sensor component 1214 may detect an on/off status of the device 1200 for determining the size of the DCI format and relative positioning of components, such as a display and small keyboard of the device 1200 for determining the size of the DCI format, and the sensor component 1214 may further detect a change in a position of the device 1200 for determining the size of the DCI format or a component of the device 1200 for determining the size of the DCI format, presence or absence of contact between the user and the device 1200 for determining the size of the DCI format, orientation or acceleration/deceleration of the device 1200 for determining the size of the DCI format and a change in temperature of the device 1200 for determining the size of the DCI format. The sensor component 1214 may include a proximity sensor, configured to detect presence of an object nearby without any physical contact. The sensor component 1214 may also include a light sensor, such as a complementary metal oxide semiconductor (CMOS) or charge coupled device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wirelessly communication between the device 1200 for determining the size of the DCI format and other devices. The device 1200 for determining the size of the DCI format may access a communication-standard-based wireless network, such as a wireless fidelity (WiFi) network, a 2nd-generation (2G) or 3rd-generation (3G) network or a combination thereof. In an exemplary embodiment, the communication component 1216 receives a broadcast signal or broadcast associated information from an external broadcast management system via a broadcast channel In an exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the device 1200 for determining the size of the DCI format may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above described methods.

In an exemplary embodiment, there is also provided a non-transitory computer-readable storage medium including instructions, such as included in the memory 1204, executable by the processor 1220 of the device 1200 for determining the size of the DCI format to complete the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

A non-transitory computer-readable storage medium is provided; instructions in the storage medium cause, when executed by a processor of the device 1200 for determining a size of a DCI format, the device 1200 for determining the size of the DCI format to perform the following method for determining the size of the DCI format. The method may include: a size of a DCI format sent by a network device is received, the size of the DCI format being the size of the DCI format that is determined by the network device according to a length of information bits borne by the DCI format, and needs to be detected by a terminal; and when DCI matching the size of the DCI format is detected, information bits borne by a DCI format are acquired.

In an embodiment, the operation that the size of the DCI format sent by the network device is received may include: a system message sent by the network device is received, the system message including information capable of determining the length of the information bits borne by the DCI format; or, first control signaling sent by the network device is received, the first control signaling including information capable of determining the length of the information bits borne by the DCI format.

In an embodiment, the method may further include: second control signaling sent by the network device is received, the second control signaling includes a size of a predetermined DCI format; and the number of blind detection times of the terminal is determined according to the size of the predetermined DCI format and the number of sizes of the predetermined DCI format.

In an embodiment, the method may further include: a proportional relationship between a CRC length and the size of the DCI format that is sent by the network device is received; and a CRC length for the DCI format is determined according to the size of the DCI format, and the proportional relationship between the CRC length and the size of the DCI format.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for determining a size of a downlink control information (DCI) format, applied to a network device, and comprising:

determining, according to a length of information bits to be actually borne by the DCI format, the size of the DCI format that needs to be detected by a terminal, wherein the size of the DCI format is determined based on the DCI format and the length of information bits to be actually borne by the DCI format, and the size of the DCI format is different from a size of a predetermined DCI format; and sending information for indicating the size of the DCI format to the terminal, wherein sending the information for indicating the size of the DCI format to the terminal comprises:

sending a control signaling to the terminal, the control signaling including the length of the information bits to be actually borne by the DCI format, wherein the size of the DCI format is sent through higher layer signaling.

2. The method of claim 1, further comprising one of:

sending cyclical redundancy check (CRC) length information for the DCI format to the terminal; or sending a proportional relationship between a CRC length and the size of the DCI format to the terminal.

3. A method for determining a size of a downlink control information (DCI) format, applied to a terminal, and comprising:

receiving information for indicating the size of the DCI format sent by a network device, the size of the DCI format being the size of the DCI format that is determined by the network device according to a length of information bits to be actually borne by the DCI format and that needs to be detected by the terminal, wherein the size of the DCI format is determined by the network device based on the DCI format and the length of information bits to be actually borne by the DCI format, and the size of the DCI format is different from a size of a predetermined DCI format; and acquiring, in response to detecting DCI matching the size of the DCI format, information bits to be actually borne by the DCI format, wherein receiving the information for indicating the size of the DCI format sent by the network device comprises:

receiving a control signaling sent by the network device, the control signaling including the length of the information bits to be actually borne by the DCI format, wherein the size of the DCI format is sent through higher layer signaling.

4. The method of claim 3, further comprising one of:

receiving a proportional relationship between a cyclical redundancy check (CRC) length and the size of the DCI format that is sent by the network device; and determining a CRC length for the DCI format according to the size of the DCI format and the proportional relationship between the CRC length and the size of the DCI format; or receiving CRC length information for the DCI format sent by the network device.

5. A terminal for determining a size of a downlink control information (DCI) format, comprising:

a processor; and a memory storing instructions executable by the processor, wherein the processor is configured to:

receive information for indicating the size of the DCI format sent by a network device, the size of the DCI format being the size of the DCI format that is determined by the network device according to a length of information bits to be actually borne by the DCI format and that needs to be detected by the terminal, wherein the size of the DCI format is determined by the network device based on the DCI format and the length of information bits to be actually borne by the DCI format, and the size of the DCI format is different from a size of a predetermined DCI format; and acquire, in response to detecting DCI matching the size of the DCI format, information bits to be actually borne by the DCI format;

wherein receiving the information for indicating the size of the DCI format sent by the network device comprises:

receiving a control signaling sent by the network device, the control signaling including the length of the information bits to be actually borne by the DCI format, wherein the size of the DCI format is sent through higher layer signaling.

6. The terminal of claim 5, wherein the processor is further configured to:

receive a proportional relationship between a cyclical redundancy check (CRC) length and the size of the DCI format that is sent by the network device; and determine a CRC length for the DCI format according to the size of the DCI format and the proportional relationship between the CRC length and the size of the DCI format.

7. The terminal of claim 5, wherein the processor is further configured to:

receive CRC length information for the DCI format sent by the network device.

8. A non-transitory computer-readable storage medium, storing computer instructions, the instructions being executed by a processor to perform the method of claim 1.

9. A non-transitory computer-readable storage medium, storing computer instructions, the instructions being executed by a processor to perform the method of claim 3.

10. The method of claim 1, wherein the size of the DCI format is not in an association relationship with a network bandwidth.

11. The method of claim 3, wherein the size of the DCI format is not in an association relationship with a network bandwidth.

12. The terminal of claim 5, wherein the size of the DCI format is not in an association relationship with a network bandwidth.

* * * * *